United States Patent Office 2,702,703
Patented Feb. 22, 1955

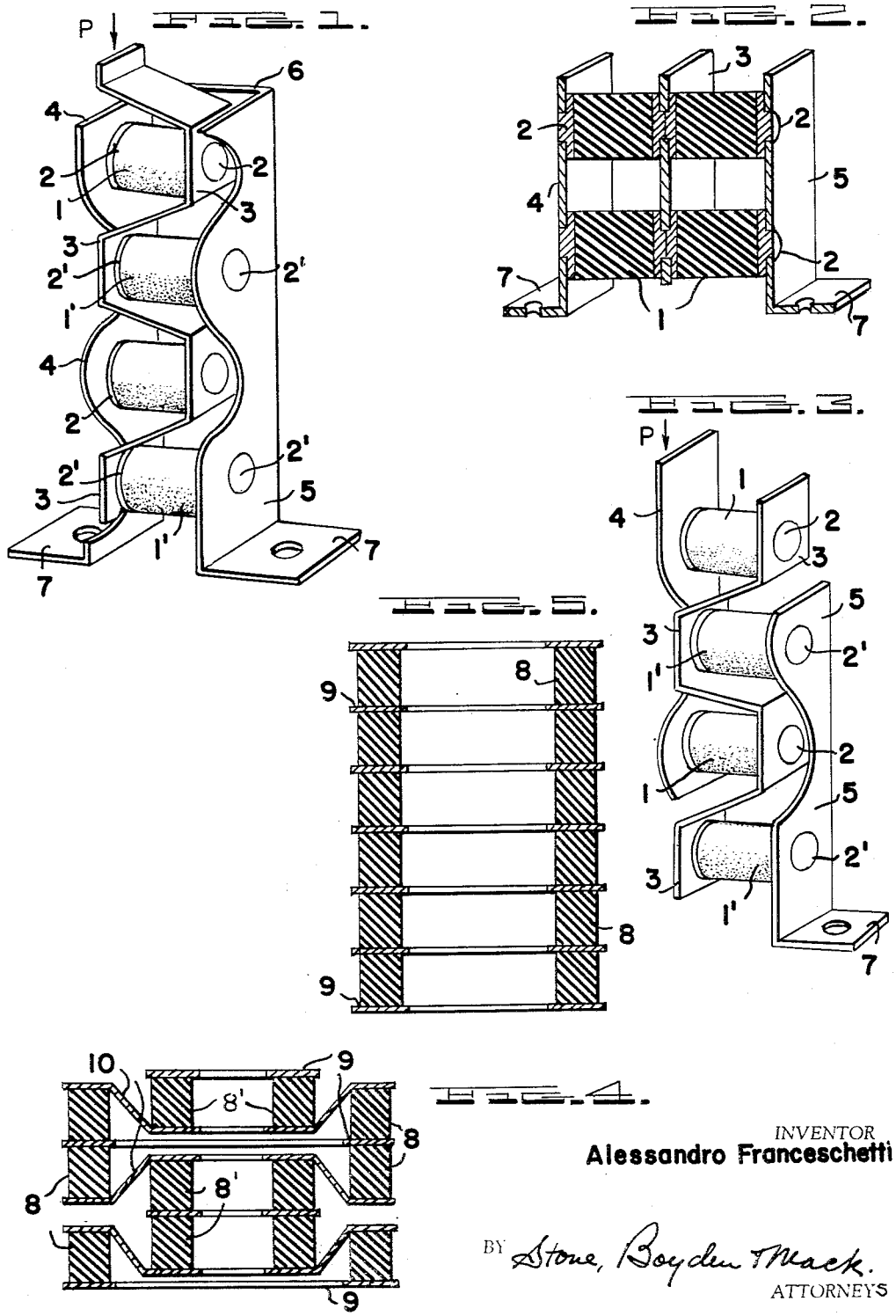

2,702,703

SYSTEM OF ASSEMBLING ELASTIC ELEMENTS IN SPRING SUPPORTS

Alessandro Franceschetti, Milan, Italy, assignor to S. A. G. A. Società Applicazioni Gomma Antivibranti, Milan, Italy, a corporation of Italy Application September 27, 1949, Serial No. 118,082

8 Claims. (Cl. 267—63)

This invention pertains to spring supports and more particularly has reference to systems of elastic elements assembled in spring supports for fixed or mobile machinery.

Spring supports for fixed or mobile machinery of the type comprising elastic (and especially rubber) elements which work in series, in parallel, or in parallel-series, are well known. In such applications, the elastic (rubber) elements work in parallel, in order to bear a greater total applied load with a determined deformation, or two or more groups of elastic elements work in series, in order to allow a greater total deflection under load.

From a technical viewpoint these assemblies of elastic elements in series, parallel or parallel-series give quite satisfactory results, but often situations arise in which the space available is insufficient for their accommodation, which either precludes their use or causes difficulties in assembling the elements. In particular, the available space is often greater than necessary in one direction, while insufficient in another direction, so that the necessary combination of dimensions is not obtainable to accommodate the prior art constructions and arrangements of spring supports and resilient mountings.

An object of this invention is to overcome these difficulties by providing improvement in spring supports which are better adapted to fit into and utilize the working space available for them.

Another object of this invention is to provide improved spring supports having more compact arrangements of elements which require greatly reduced bearing and load-contacting areas for a given load, or greatly reduced working space (in the direction of the applied load) for a given required deflection and resiliency.

Another object of this invention is to improve spring supports by connecting their elastic elements by means of supporting frames so shaped as to permit the assembly of said elements in such manner as to best utilize the available spaces for said springs and resilient mountings.

With these and other objects in view which may be incident to my improvements, my invention consists in the combination and arrangement of elements hereinafter described and illustrated in the accompanying drawings, in which:

Fig. 1 is a perspective view of a spring according to my invention, wherein the elastic elements are stressed in shear-flexion and connected in parallel;

Fig. 2 is also a perspective view, partly in section, of a spring of prior art type having elastic elements working in parallel;

Fig. 3 is a perspective view of another spring according to my invention, wherein the elastic elements are stressed in shear-flexion and connected in parallel-series;

Fig. 4 is a vertical section of another spring according to my invention, wherein the elastic elements are stressed in compression and connected in series;

Figure 5 is also a vertical section of a spring of another prior art type having elements working in series.

Referring to Fig. 1, the reference numerals 1 and 1' denote a plurality of cylindrical elastic elements, each having lugged, metal disks 2 and 2' and which are assembled in parallel by means of an undulated, rigid metal web member 3 which connects the alternately opposed ends of successively adjacent elements 1 and 1' through disks 2 and 2' mounted thereon. Thus, web 3 connects the right end of the first element 1 to the left end of the second element 1', successively to the right end of the third element 1, and so on. The opposite ends of elements 1 and 1' are alternately mounted in and connected together by metal side plates 4 and 5 which are tied together by a metal cross plate 6; the plates 4, 5 and 6 preferably forming a unitary frame. When the applied load P acts on the assembled spring as indicated by the arrow, all the elastic elements work in parallel and transmit said load to supporting base 7.

For comparison with my novel spring of Fig. 1, there is shown in Fig. 2 a prior art spring, having elastic elements 1, identical in size, shape and construction, with elements 1 and 1' of Fig. 1, and which also work in parallel. The spring of Fig. 1 has the same elastic deformability and resistance as the spring of Fig. 2, but the width of the former is approximately only half that of the latter. The spring of Fig. 1 is also equal in equilibrium against bending moment to the spring of Fig. 2, but requires only half of the base area of the latter. The novel arrangement of Fig. 1 therefore solves the problem of assembly when the available space is insufficient in width but ample in height.

The construction shown in Fig. 3 differs from that of Fig. 1 chiefly in the arrangement of the elastic elements which work in parallel-series in the form shown in Fig. 3. In the construction shown in Fig. 3, all of the left-hand disks 2 of alternate elements 1 are connected together by plate 4 and the right-hand disks 2' of elements 1' are similarly connected together by plate 5, while the oposite ends of elements 1 and 1' are connected together by undulated, rigid metal web member 3, as in Fig. 1. The load P applied to the spring of Fig. 3 is transmitted from disks 2 through the group of elastic elements 1 to web 3 and thence through the group of elastic elements 1' and frame 5 to supporting base 7. The elastic elements of the same group work in parallel, while the two groups 1 and 1' work in series.

Referring to Fig. 4, reference numerals 8 and 8' denote, respectively, a plurality of outer and inner elastic elements of a spring, circularly shaped in plan, in which the elastic rings are arranged concentrically at different heights and are separated by annular metal frames 9 and 10, the former being flat while the latter are deformed as shown in Fig. 4. The rubber elements 8 and 8' are stressed in compression and work in series. The spring of Fig. 4, instead of being shaped circularly in plan, may be elliptical, or in the form of an open curve or straight line; for example, straight strips may be used instead of rings. Thus, the sections of elastic elements of each plane of Fig. 4 might represent sections of rectilinear strips, in which case the strips of the same plane would work in parallel, while those of different planes would work in series, so that the spring would be of the parallel series type.

For comparison with my improved spring of Fig. 4, there is shown in Fig. 5 a prior art spring of exactly the same deformability and resistance as the spring of Fig. 4, but which requires a space of approximately twice the height of the spring of Fig. 4. Therefore, the arrangement shown in Fig. 4 solves the problem where the available space in the direction of height is reduced while the space in horizontal directions (width and length) is ample.

The elastic elements of the springs herein disclosed have been referred to as composed of rubber as the preferred type, but they may also take the form of elastic metal springs, if desired.

While I have shown and described the preferred embodiments of my invention, I desire it to be understood that I do not limit myself to the constructional details disclosed by way of illustration, as it is apparent that these may be changed and modified by those skilled in the art without departing from the spirit of my invention or exceeding the scope of the appended claims.

I claim:

1. A resilient support for fixed or mobile machinery, comprising a plurality of elastic elements mounted and held in working alignment by a unitary metal frame, wherein the elastic elements are interspaced between one another and are interconnected by a rigid metal web member to which the supported load is directly applied, said member being attached to alternately opposite ends of adjacent elastic elements and of a shape mutually accommodating the relative interspaced positions of the elements, with consequent major reduction of the dimensions of the assembly in directions at right angles to the direction of the supported load, in comparison with an assembly of the same load capacity and elastic deformability in which the elastic elements are not so arranged.

2. A resilient support according to claim 1 wherein the elastic elements are composed of rubber and are stressed in shear-flexion in the main plane coinciding with the direction of action of the applied load.

3. A resilient support according to claim 1, wherein all the elastic elements are arranged in a single rectilinear alignment and said web member connects alternately opposite ends of adjacent elastic elements.

4. A resilient support according to claim 1, wherein the elastic elements are connected together so as to work all in parallel.

5. A resilient support for fixed or mobile machinery, comprising: a pair of parallel metal side plates, connected together by a metal cross plate to form a unitary, rigid frame; a series of elastic elements mounted in said frame and held in spaced, working alignment in the direction of application of the supported load, by attachment of said elastic elements alternately at one end to one of said side plates, and at the opposite end to the other of said side plates; the remaining end of each elastic element being attached to a rigid, corrugated, web member, so that each adjacent elastic element is positioned in an adjacent corrugation of said web member; whereby the dimensions of the assembled support, in directions at right angles to the direction of application of the supported load, are substantially reduced, in comparison with those of a support of the same load capacity and elastic deformability in which the elastic elements are not so arranged.

6. A resilient support according to claim 5, wherein the supported load is applied directly to one end of said web member.

7. A resilient support according to claim 5, wherein the elastic elements are composed of rubber and are stressed in shear-flexion in a plane coinciding with the direction of application of the supported load.

8. A resilient support according to claim 5 wherein all the elastic elements work in parallel.

References Cited in the file of this patent

UNITED STATES PATENTS

| | | |
|---|---|---|
| 1,646,991 | Chilton | Oct. 25, 1927 |
| 2,338,323 | Fink | Jan. 4, 1944 |
| 2,406,875 | Wallerstein | Sept. 3, 1946 |
| 2,453,012 | Hickman | Nov. 2, 1948 |

FOREIGN PATENTS

| | | |
|---|---|---|
| 613,404 | Great Britain | Nov. 25, 1948 |
| 874,581 | France | Aug. 11, 1942 |